No. 859,529. PATENTED JULY 9, 1907.
H. H. STEELE.
TYPE WRITING MACHINE.
APPLICATION FILED SEPT. 14, 1906.
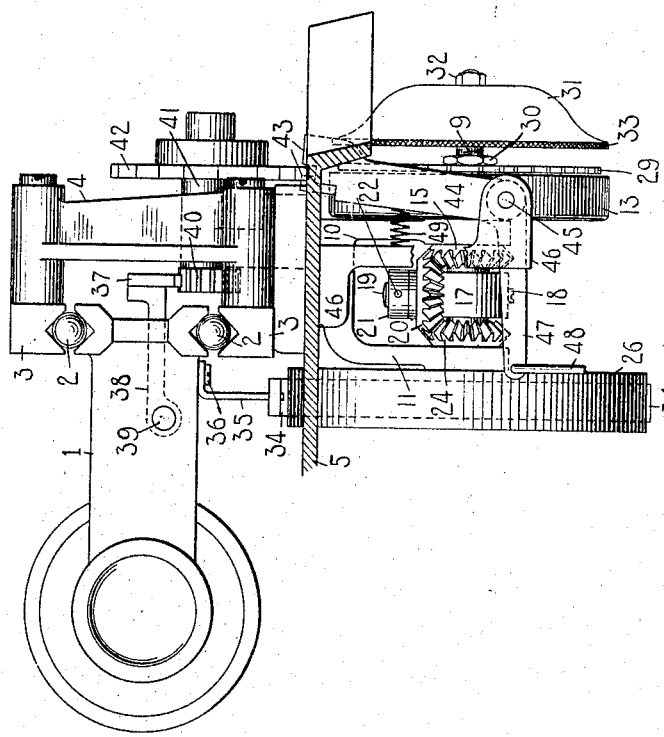
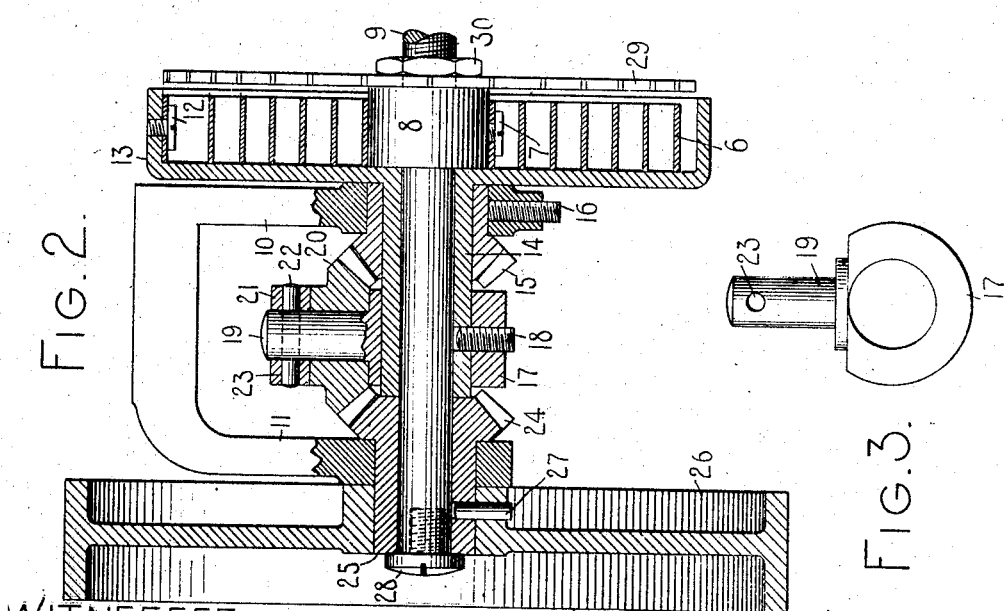
WITNESSES:
M. F. Hanneweber
R. H. Strother.
INVENTOR.
Herbert H. Steele
By Jacob Felbel
HIS ATTORNEY

UNITED STATES PATENT OFFICE.

HERBERT H. STEELE, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

No. 859,529.   Specification of Letters Patent.   Patented July 9, 1907.

Application filed September 14, 1905. Serial No. 278,448.

*To all whom it may concern:*

Be it known that I, HERBERT H. STEELE, a citizen of the United States, and a resident of Syracuse, in the county of Onondaga and State of New York, have invented certain new and useful Improvements in Type-Writing Machines, of which the following is a specification.

My invention relates to typewriting machines, and it has for its principal object to provide an improved means for driving the carriages of such machines, more especially when said carriages are of more than the ordinary width.

My invention consists in certain features of construction and combinations and arrangements of parts, all of which will be fully set forth herein and particularly pointed out in the claims.

In the accompanying drawings, Figure 1 is a side elevation of a part of a typewriting machine. Fig. 2 is an enlarged central vertical sectional view of the carriage driving mechanism. Fig. 3 is a detail view of a portion of the mechanism to be hereinafter described.

My invention is applicable to typewriting machines generally, but for the sake of illustration I have here shown it applied to a Monarch typewriter. The carriage 1 of this machine is supported by anti-friction balls or rollers 2 that co-operate with the grooved back bar of said carriage and with grooved rails 3, which are supported by posts or brackets 4, rising from a top plate 5. The carriage is drawn across the machine by power derived from a coiled spring 6, the inner end of which is secured by a screw 7 to an enlarged portion 8 of an adjusting shaft 9 that is mounted in a bracket depending from the top plate 5 and having a rear arm 10 and a front arm 11. The spring 6 stands back of said rear arm 10 and has its outer end secured by a screw 12 to a casing 13 having an elongated hub or sleeve 14 surrounding the shaft 9 and extending toward the front of the machine. The sleeve or hub 14 extends through an axial opening in a fixed bevel gear 15, the hub of which is seated in a suitable opening in the bracket arm 10, where it is rigidly secured by a set screw 16 threaded through said bracket arm and engaging said hub. The sleeve 14 may be said to be journaled in the bevel gear 15 and its hub and journaled on the shaft 9. On the forward end of the sleeve 14 a collar 17 is rigidly secured by a screw 18 passing through said collar and into said sleeve. Said collar 17 has projecting radially therefrom a stud 19, on which is journaled a planetary bevel gear 20 that meshes with the fixed bevel gear 15. The bevel gear 20 is held in position on the stud 19 by a collar 21 mounted on the end of said stud and secured in position by a pin 22 passing through holes 23 in said collar and stud. The planetary bevel gear 20 meshes with a rotatable bevel gear 24, the elongated hub 25 of which surrounds the shaft 9 and projects through a suitable opening in the bracket arm 11 in which it is journaled. On the forwardly projecting end of the hub 25, a carriage driving wheel 26 is mounted and rigidly secured by a pin 27 passing through the hub of said carriage driving or tape wheel and into said sleeve. The forward face of the spring casing 13 bears against the arm 10, or the rear end of the hub of the fixed gear 15, and the shoulder formed on the shaft 9 by the enlargement 8, bears against said casing 13, so that axial motion of these parts toward the front of the machine is prevented. The forward end of the sleeve 14 also bears against the bevel gear 24, which in turn bears against the bracket arm 11. Axial motion of the parts toward the rear of the machine is prevented by the hub of the carriage driving wheel 26 bearing against the bracket arm 11, and by the head of a screw 28 which is threaded into the forward end of the shaft 9 and engages the hub 25 of the bevel gear 24.

The usual ratchet wheel 29 is mounted on the shaft 9 just back of the enlargement 8, and is clamped between said enlargement and a nut 30 threaded onto said shaft 9. The usual alarm bell 31 is rigidly secured on the rear end of the shaft 9 by a nut 32, and said bell is formed with a knurled edge 33 for convenience in turning it together with the shaft 9. The usual double retaining pawl (not shown) co-operates with the ratchet wheel 29. The carriage driving wheel 26 is, in the present instance, a tape wheel which projects slightly above the top plate 5, as usual, and has secured thereto one end of the usual tape or band 34, the other end of which is secured to a bracket 35 depending from the carriage 1, to which it is secured by a screw 36. In machines in which the spring drum is geared to the carriage, the tape wheel 26 will, of course, be replaced with a gear wheel.

The machine may be equipped with any suitable devices for controlling the motion of the carriage. I have here shown an escapement mechanism similar to that ordinarily employed in the Monarch machine. A feed rack 37 is mounted on arms 38 that are pivoted to the carriage at 39. Said feed rack meshes with a pinion 40 that is mounted on a shaft journaled in a housing 41 and carrying at its rear end an escapement wheel 42, which is controlled by feed dogs 43 mounted on the upwardly extending arm 44 of a dog rocker which is pivoted at 45 in a bracket 46 depending from the top plate 5. Said dog rocker has a forwardly extending arm 47 that is connected by a link 48 with a universal bar (not shown) that is controlled in the usual manner by the character keys and space key of the machine. The arm 44 is normally held in its rear position by a returning spring 49 that is compressed between the arm 44 and bracket 46.

In operation the spring 6 is placed under any desired degree of tension by turning the adjusting shaft 9 by means of the bell 31. When the escapement mechanism is operated by the character keys or the space key, the spring drum 13 turns toward the left, turning the collar 17 toward the left about the shaft 9. The planetary gear 20 meshing as it does with the stationary gear 15, imparts to the rotary gear 24 and the tape wheel 26 a left-hand rotary motion double that of the case 13. It will thus be perceived that with the same length of spring 6 and with the same diameter of tape wheel 26 the carriage may be fed double the distance that it would be if said tape wheel were connected directly with the spring drum. In other words, I have provided a multiplying gear between the spring drum and the tape wheel. It will be observed that the spring drum and the tape wheel rotate in the same direction, namely toward the left, and that in order to tighten the spring 6 the bell 31 will also be turned toward the left. This is an advantage because the operators of these machines have long been accustomed to turn this adjusting device in this direction to tighten the spring. It will also be perceived that the spring drum, the multiplying gear and the tape wheel are all co-axial, being all arranged along the shaft 9, as has been usual in the simpler forms of carriage driving devices heretofore used. This is also advantageous because it enables me to place my driving gear with its speed multiple feature in the same place in the machine, as has heretofore been occupied by the ordinary driving mechanism, so that the insertion of this mechanism does not disturb the arrangement of the parts of existing machines. My carriage driving mechanism may be placed in the Monarch machine or in other standard machines without in any manner changing the general design of said machines. It will also be observed that the driving mechanism is complete in itself, being all mounted in the bracket 10, 11, which may be secured to the top plate 5 after the parts have been assembled. It will, of course, be understood that in this carriage driving mechanism, the spring 6 will be somewhat heavier than in those instances where no multiplying gear is employed, but said spring will not necessarily be any longer in the case of a wide carriage machine than the springs ordinarily used in machines having carriages of the ordinary width.

Various changes in the details of construction and arrangement may be made without departing from my invention.

What I claim as new and desire to secure by Letters Patent, is:—

1. In a typewriting machine, the combination of a carriage, a spring drum, a carriage driving wheel, a band connecting said driving wheel with the carriage and arranged to draw said carriage in letter-space direction, and means for communicating motion from the said spring drum to the carriage driving wheel and imparting to said wheel an angular velocity greater than that of said spring drum, the construction and arrangement being such that the carriage is drawn a greater distance at each turn of the spring drum than it would if said driving wheel were connected directly to said spring drum.

2. In a typewriting machine, the combination of a carriage, a spring drum, a carriage driving wheel, a band connecting said driving wheel with the carriage and arranged to draw said carriage in letter-space direction, and multiplying gear connections between said spring drum and said driving wheel and adapted to turn the driving wheel at an angular velocity greater than that of said spring drum and in the same direction as said spring drum, the construction and arrangement being such that the carriage is drawn a greater distance at each turn of the spring drum than it would if said driving wheel were connected directly to said spring drum.

3. In a typewriting machine, the combination of a carriage, a driving wheel connected with said carriage, a spring drum and a planetary multiplying gear operatively connected with said driving wheel and spring drum for communicating motion from the spring drum to said driving wheel, the motion of the driving wheel being at a greater angular velocity than said spring drum.

4. In a typewriting machine, the combination of a carriage, a shaft, a spring drum on said shaft, a carriage driving wheel on said shaft, a gear that turns on said shaft and is connected with said driving wheel, a fixed gear, and a planetary gear carried by said shaft and which cooperates with said fixed gear and with the gear on the driving wheel, whereby motion is communicated from the spring drum to the driving wheel through said intermediate gears and the angular velocity of the driving wheel is greater than that of said spring drum.

5. In a typewriting machine, the combination of a carriage, a shaft, a spring on said shaft, a carriage driving wheel on said shaft; and means on said shaft for communicating motion from said spring to said carriage driving wheel, and imparting to said wheel an angular velocity greater than that of the part to which said spring is immediately connected.

6. In a typewriting machine, the combination of a carriage, a spring drum, a carriage driving wheel co-axial with said spring drum, and a multiplying gear connecting said spring drum with said driving wheel and adapted to turn said driving wheel in the same direction as said spring drum.

7. In a typewriting machine, the combination of a carriage; a shaft, a driving wheel on said shaft and connected to said carriage, a spring drum on said shaft, and a planetary multiplying gear on said shaft for communicating the motion of said spring to said driving wheel.

8. In a typewriting machine, the combination of a carriage, a spring drum for driving said carriage, and connections between said spring drum and carriage including a planetary multiplying gear co-axial with said spring drum.

9. In a typewriting machine, the combination of a carriage, a driving wheel connected with said carriage, a bevel gear connected with said carriage driving wheel, a fixed bevel gear, a planetary bevel gear engaging both of the first mentioned bevel gears, and a spring drum connected with said planetary bevel gear.

10. In a typewriting machine, the combination of a carriage, an adjusting shaft, a spring having one end connected with said adjusting shaft, a casing having a sleeve or hub journaled on said adjusting shaft and having the other end of said spring connected thereto, a planetary gear mounted on said sleeve or hub, a fixed gear and a rotatable gear engaged by said planetary gear, said rotatable gear being journaled on said adjusting shaft, and means whereby said rotatable gear drives said carriage.

11. In a typewriting machine, the combination of a carriage, a spring drum, a driving wheel co-axial with said spring drum, a band connecting said driving wheel with the carriage, and a multiplying gear connecting said spring drum with said driving wheel and adapted to turn said driving wheel a plurality of rotations to one rotation of said spring drum.

Signed at Syracuse, in the county of Onondaga, and State of New York, this 8th day of September A. D. 1905.

HERBERT H. STEELE.

Witnesses:
JOHN S. MITCHELL,
H. A. AUMENT.